United States Patent
Pawliczek et al.

(10) Patent No.: US 10,919,644 B2
(45) Date of Patent: Feb. 16, 2021

(54) MULTI-MODE AIRCRAFT NAVIGATION LIGHT AND AIRCRAFT COMPRISING THE SAME

(71) Applicant: Goodrich Lighting Systems GmbH, Lippstadt (DE)

(72) Inventors: Carsten Pawliczek, Lippstadt (DE); Anil Kumar Jha, Lippstadt (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/407,225

(22) Filed: May 9, 2019

(65) Prior Publication Data
US 2019/0359348 A1 Nov. 28, 2019

(30) Foreign Application Priority Data
May 22, 2018 (EP) .................... 18173613

(51) Int. Cl.
| | | |
|---|---|---|
| *B64D 47/04* | (2006.01) | |
| *F21V 5/04* | (2006.01) | |
| *F21V 7/00* | (2006.01) | |
| *F21V 23/00* | (2015.01) | |
| *F21V 23/04* | (2006.01) | |

(Continued)

(52) U.S. Cl.
CPC ............. *B64D 47/04* (2013.01); *F21V 5/04* (2013.01); *F21V 7/0091* (2013.01); *F21V 23/003* (2013.01); *F21V 23/0457* (2013.01); *F21V 23/0492* (2013.01); *B64D 2203/00* (2013.01); *F21Y 2113/13* (2016.08); *F21Y 2115/10* (2016.08)

(58) Field of Classification Search
CPC ....... B64D 47/04; B64D 2203/00; F21V 5/04; F21V 7/0091; F21V 23/003; F21V 23/0457; F21V 23/0492; F21Y 2113/13; F21Y 2115/10
See application file for complete search history.

(56) References Cited

U.S. PATENT DOCUMENTS

| | | | |
|---|---|---|---|
| 8,192,060 B2* | 6/2012 | Wilkinson ............. | B64D 47/06 362/470 |
| 2005/0213321 A1 | 9/2005 | Lin | |

(Continued)

FOREIGN PATENT DOCUMENTS

| | | |
|---|---|---|
| EP | 1903607 A2 | 3/2008 |
| EP | 2735785 A1 | 5/2014 |

(Continued)

OTHER PUBLICATIONS

Extended European Search Report for International Application No. 18173613.3 dated Oct. 25, 2018, 10 pages.

*Primary Examiner* — Mary Ellen Bowman
(74) *Attorney, Agent, or Firm* — Cantor Colburn LLP (57) ABSTRACT

A multi-mode aircraft navigation light includes a first light source of a first color; a second light source of a second color; and a common optical system, which is arranged over the first light source and the second light source for conditioning light emitted by either one of the first light source and the second light source; and a switching circuit configured to effect power supply to a selected one of the first light source and the second light source depending on a color selection signal.

20 Claims, 6 Drawing Sheets

(51) Int. Cl.
*F21Y 113/13* (2016.01)
*F21Y 115/10* (2016.01)

(56) References Cited

U.S. PATENT DOCUMENTS

| | | | | |
|---|---|---|---|---|
| 2006/0249663 A1* | 11/2006 | Ewig | .................. | H05B 45/40 |
| | | | | 250/221 |
| 2007/0063321 A1 | 3/2007 | Han et al. | | |
| 2016/0280396 A1* | 9/2016 | Schoen | ................. | B64D 47/06 |
| 2017/0295622 A1 | 10/2017 | Harris | | |

FOREIGN PATENT DOCUMENTS

| | | | |
|---|---|---|---|
| EP | 3072819 | A1 | 9/2016 |
| WO | 03008858 | A1 | 1/2003 |

\* cited by examiner

MULTI-MODE AIRCRAFT NAVIGATION LIGHT AND AIRCRAFT COMPRISING THE SAME

FOREIGN PRIORITY

This application claims priority to European Patent Application No. 18173613.3 filed May 22, 2018, the entire contents of which is incorporated herein by reference.

The present invention relates to exterior aircraft lighting. In particular, it relates to an aircraft navigation light.

Almost all aircraft are equipped with exterior lighting systems. For example, large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights. It is apparent that the exterior lighting systems of modern aircraft are very complex technical systems.

Accordingly, it would be beneficial to provide an exterior aircraft light that allows for an overall less complex exterior aircraft lighting system and to provide an aircraft equipped therewith.

SUMMARY

Exemplary embodiments of the invention include a multi-mode aircraft navigation light, comprising a first light source of a first color; a second light source of a second color; and a common optical system, which is arranged over the first light source and the second light source for conditioning light emitted by either one of the first light source and the second light source; and a switching circuit configured to effect power supply to a selected one of the first light source and the second light source depending on a color selection signal.

Exemplary embodiments of the invention allow for the provision of a navigation light that is usable in multiple locations of an aircraft and that, thus, allows for reducing the number of different light units required for the exterior aircraft lighting system. For example, a multi-mode aircraft navigation light according to exemplary embodiments of the invention may be usable both for the starboard side of an aircraft and the port side of an aircraft, thus allowing for the production, storage, and assembly line usage of only one type of aircraft navigation light for two locations. As compared to previous approaches, where two different, but confusingly similar navigation lights were used, exemplary embodiments of the invention allow for efficiency gains in the production of navigation lights, space savings in the storage of navigation lights, reduction of assembly errors during the assembly of the navigation lights to the aircraft, and/or reduction of assembly time losses due to hold-ups on the assembly line of the aircraft.

The multi-mode aircraft navigation light has a first light source of a first color and a second light source of a second color. In this way, the multi-mode aircraft navigation light can assume the functionality of two previously different navigation lights. In accordance with its positioning in the aircraft, the multi-mode aircraft navigation light can carry out the desired functionality. With navigation lights for aircraft commonly emitting one of red, green, and white light, the provision of light sources of at least two different colors allows for the multi-mode aircraft navigation light, as described herein, to be used in place of at least two navigation lights of previous approaches.

The switching circuit is configured to effect power supply to a selected one of the first light source and the second light source depending on a color selection signal. The multi-mode aircraft navigation light is able to adapt its light output in accordance with the internal color selection signal. In other words, the multi-mode aircraft navigation light has internal switching capability that allows for the selection of the emitted light color, depending on what light output is desired in accordance with the color selection signal. As will be laid out below, the color selection signal may be generated internally within the multi-mode aircraft navigation light or may be provided from an external command or may be derived from the connection of the multi-mode navigation aircraft light to its environment in the aircraft. Regardless of how the multi-mode aircraft navigation light generates or receives the color selection signal, it is generally capable of emitting light of the first color as well as light of the second color. No light source is removed or disabled during assembly of the multi-mode aircraft navigation light to the aircraft.

The switching circuit is configured to effect power supply to a selected one of the first light source and the second light source depending on a color selection signal. The color selection signal may also be seen as an operating mode command, with light emission of the first color and light emission of the second color representing different operating modes of the multi-mode aircraft navigation light. The multi-mode aircraft navigation light may be operated in at least two operating modes, with the color selection signal selecting the operating mode for a given operating condition/light unit position within the aircraft.

The color selection signal may be any kind of encoded form of information regarding the selection of the color. It may be a binary signal, controlling a simple switch, for two operating modes. It may also be a signal that has the information encoded in a more elaborate protocol.

The multi-mode aircraft navigation light is an aircraft navigation light that has at least two operating modes, i.e. that can be operated in at least two colors. The multi-mode aircraft navigation light may have exactly two operating modes, one corresponding to the emission of light of the first color and the other one corresponding to the emission of light of the second color. It is also possible that the multi-mode aircraft navigation light has more operating modes, for example three operating modes, corresponding to light output of three different colors. The number of modes may also be seen as relating to the number of previous single color navigation lights that may be replaced with the multi-mode aircraft navigation light according to exemplary embodiments of the invention.

The first light source and the second light source may be mounted on a common mounting board. In particular, the first light source and the second light source may be mounted on a common printed circuit board. The mounting board may be arranged in the multi-mode aircraft navigation light in such a way that it is oriented generally vertically in the aircraft frame of reference. The common optical system may also be mounted to the common mounting board. Mounting the first light source, the second light source, and the common optical system to a common mounting board allows for providing a well-defined and mechanically stable arrangement.

The common optical system is arranged over the first light source and the second light source for conditioning light emitted by either one of the first light source and the second light source. The term arranged over relates to an arrangement of the common optical system in the light path of both the first light source and the second light source. It does not specify a particular orientation of the common optical system within the aircraft frame of reference. Rather, the common optical system may be arranged over the first light source and the second light source, when seen from the structure to which the first light source and the second light source are mounted. In other words, the common optical system is arranged in the light emission directions of both the first light source and the second light source.

The common optical system is arranged over the first light source and the second light source for conditioning light emitted by either one of the first light source and the second light source. If both the first light source and the second light source were to be switched on at the same time, the common optical system would affect the light of both the first light source and the second light source. The common optical system affects the light of each of the first light source and the second light source, when switched on, respectively.

The common optical system may in particular be configured to affect light from the first light source and light from the second light source in an analogous or substantially identical manner. The distance between the first light source and the second light source may be much smaller, i.e. at least an order of magnitude smaller, than the extension of the common optical system. Hence, an analogous or substantially identical light output may be achieved for the two different colors. The multi-mode aircraft navigation light may thus be used in place of two different previous navigation lights, with the light output being adapted equally well to the requirements of both previous navigation lights.

The first and second light sources may have an extension of less than 3 mm. The common optical system may have an extension of between 10 mm and 50 mm.

The first light source and the second light source may be LEDs. In particular, the first light source and the second light source may be LEDs that generate light emission of the first color and of the second color, respectively. It is also possible that the first light source and the second light source are formed by an LED of an arbitrary color, such as a white LED, in combination with a respective color filter.

The multi-mode aircraft navigation light may be configured to satisfy the Federal Aviation Regulation (FAR) requirements for at least two of the red forward navigation light, the green forward navigation light, and the white rear navigation light. In particular, the multi-mode aircraft navigation light may be configured to satisfy the Federal Aviation Regulation (FAR) requirements for the red forward navigation light and the green forward navigation light. In this context, reference is made to FAR sections 25.1385 through 25.1397, in particular to FAR sections 25.1391 and 25.1393. Further in particular, the multi-mode aircraft navigation light may be configured to satisfy the FAR requirements of said at least two of the red forward navigation light, the green forward navigation light, and the white rear navigation light with the operation of a single light source. In particular, the multi-mode aircraft navigation light may be configured to satisfy the FAR requirements for the green forward navigation light with operating the first light source only and may be configured to satisfy the FAR requirements for the red forward navigation light with operating the second light source only. In other words, the multi-mode aircraft navigation light may provide the full coverage, as required by the FAR requirements, for two kinds of navigation lights.

According to a further embodiment, the multi-mode aircraft navigation light is usable as a right forward navigation light and as a left forward navigation light.

According to a further embodiment, the first color is green and the second color is red. In this way, the multi-mode aircraft navigation light may be used on the right side of the aircraft and the left side of the aircraft, i.e. on the starboard side of the aircraft and the port side of the aircraft. Instead of integrating two different navigation lights into the right side and the left side of the aircraft, such as into the right and left wingtips of an airplane, the same kind of navigation light may be used for both positions, with the desired functionality, i.e. the desired color, being set via the color selection signal.

According to a further embodiment, the first light source is a green LED and the second light source is a red LED. The provision of accordingly colored LEDs as the first light source and the second light source allows for an immediate generation of the light of the desired color. LEDs are long-lasting, small, and efficient light sources that allow for an efficient operation of the multi-mode aircraft navigation light, having low maintenance requirements and a small space envelope. Also, the provision of LEDs allows for a good integration of the two light sources with the common optical element, in particular a very close positioning of the two light sources to each other. In an alternative embodiment, it is possible to use LEDs of another color, such as white LEDs, for the first and second light sources and to apply according color filters to the LEDs.

According to a further embodiment, the multi-mode aircraft navigation light comprises only the first light source and the second light source, i.e. it does not comprise any additional light sources besides the first light source and the second light source. In this way, the multi-mode aircraft navigation light may assume the functionality of two navigation lights with a minimum number of light sources.

According to a further embodiment, the multi-mode aircraft navigation light further comprises an orientation sensor, configured to detect an orientation of the multi-mode aircraft navigation light and to provide an orientation indication to the switching circuit, with the color selection signal being based on the orientation indication. In particular, the orientation indication may form the color selection signal to the switching circuit. In this way, the multi-mode aircraft navigation light has inherent means for determining which functionality is desired and may select the appropriate color without external input and without configuration during assembly. The multi-mode aircraft navigation light may deduce from its orientation which position within the aircraft it has and may carry out an according color selection. For the exemplary case of a multi-mode aircraft navigation light that may be used on the right side of the aircraft and on the left side of the aircraft, the multi-mode aircraft navigation light may be flipped upside down when comparing the two positions to each other. When detecting whether the light is flipped with respect to a reference position, the orientation sensor may deduce whether the functionality of a right navigation light or the functionality of a left navigation light is desired.

According to a further embodiment, the orientation sensor is an inertial sensor. In particular, the orientation sensor may be an accelerometer. The orientation sensor may use the gravitational forces of the earth to determine which orientation the multi-mode aircraft navigation light has. On the basis of this information, it may be determined which color is desired. Using an inertial sensor as the orientation sensor may allow for fully decoupling the color selection from the outside environment of the multi-mode aircraft navigation light. No external signal and no analysis of the environment of the multi-mode aircraft navigation light are necessary for the color selection.

According to a further embodiment, the orientation sensor is an optical sensor. The optical sensor may analyze an optical input indicative of the environment around the multi-mode aircraft navigation light. For example, the optical sensor may be a camera capturing one or more images of the environment of the multi-mode aircraft navigation light. These images may then be analyzed for determining the position of the multi-mode aircraft navigation light within the aircraft and for selecting an according color. It is possible that the optical sensor has targeted image data processing capabilities. For example, the optical sensor may be configured to detect the horizon in the optical input and to distinguish between upwards and downwards on the basis thereof. This distinction may again be used for selecting the appropriate color. The optical sensor may be a horizon detector.

It is possible that the multi-mode aircraft navigation light has multiple orientation sensors, such as an inertial sensor and an optical sensor, which allows for cross-checking the results and for redundancy in case of a failure of one of the sensors.

According to a further embodiment, the multi-mode aircraft navigation light further comprises a color selection input, configured to receive the color selection signal from outside of the multi-mode aircraft navigation light. The color selection input may be coupled to the switching circuit for passing on the color selection signal. The color selection signal may be passed on substantially unaltered. It is also possible to transform the received color selection signal from the color selection input into a signal format that fits the framework of the switching circuit. Regardless of a potential signal format conversion, the information about the color selection is passed on from the color selection input to the switching circuit. In this way, any mechanism inherent to the multi-mode aircraft navigation light for selecting the appropriate color can be dispensed with. The multi-mode aircraft navigation light receives an external command which color is desired. In this way, the complexity of the multi-mode aircraft navigation light may be kept low.

It is also possible that the multi-mode aircraft navigation light has an orientation sensor and a color selection input. The multi-mode aircraft navigation light may be configured to only emit light of a certain color if both inputs correspond. It is also possible that the multi-mode aircraft navigation light generally relies on the orientation sensor, with the color selection input forming an override input.

According to a further embodiment, the color selection input comprises a plurality of connectors, with each of the plurality of connectors corresponding to a particular color selection. In other words, the usage/connection of a particular connector may represent the selection of a particular color. For example, the connection of a particular pin of an elaborate connector structure on the aircraft side to a particular socket on the side of the multi-mode aircraft navigation light may indicate to the multi-mode aircraft navigation light that a particular color is appropriate for the given installation position. The mere connection of that pin or the supply of a particular voltage on that pin or a particular time-varying signal on that pin may convey the color selection information. The connector structure on the aircraft side may be configured in such a way that it can only connect to the correct connector for the given position of the multi-mode aircraft navigation light. For example, the connector structure on the aircraft side may be different for the right side of the aircraft and the left side of the aircraft. Due to its different design, the connector structure may convey the correct color selection information to the multi-mode aircraft navigation light, while not being susceptible to assembly mistakes. The color selection input comprising a plurality of connectors may be a device that is configured to generate a color selection signal from the outside selection of a particular connector. It may further be configured to pass on this color selection signal to the switching circuit.

According to a further embodiment, the multi-mode aircraft navigation light further comprises a first driving circuit, configured to selectively supply power to the first light source, and a second driving circuit, configured to selectively supply power to the second light source, wherein the switching circuit is coupled to the first driving circuit and to the second driving circuit and wherein the switching circuit is configured to cause a selected one of the first driving circuit and the second driving circuit to supply power to the first light source or the second light source. Providing two separate driving circuits for the first and second light sources allows for adapting the driving to the particular needs of the light source in question. With light sources of different colors often times requiring different voltage or current levels for an optimized operation, the driving power may be adapted to the light source in question, and the operation of the multi-mode aircraft navigation light may be highly efficient for both colors.

According to an alternative embodiment, the multi-mode aircraft navigation light may comprise a driving circuit that is selectively coupleable to the first light source or to the second light source via one or more switches. In this way, the circuit complexity regarding the driving of the light sources may be kept low. The switching circuit may affect the power supply to a selected one of the first light source and the second light source downstream of a common driving circuit. While a common driving circuit with low circuit complexity may be beneficial in some embodiments, it is also possible that the common driving circuit is an adaptive driving circuit and adapts its power output depending on whether the first light source is coupled thereto or the second light source is coupled thereto. The driving circuit may be configured to sense the kind of light source coupled thereto. For example, the driving circuit may sense the forward voltage drop of the LED coupled thereto, thus being able to distinguish between different color LEDs.

According to a further embodiment, the common optical system comprises a lens, with the lens jointly encasing the first light source and the second light source. In this way, the lens is well-positioned to affect light of both the first light source and the second light source and to modify the light output of both the first color and the second color in a desired manner. The provision of a common lens for the first light source and the second light source is an effective way of reaching a desired light output intensity distribution, because the common lens can be provided in a desired free form with little complexity. In particular, the lens may be a molded structure. In particular, the lens may be overmolded over the first light source and the second light source. The lens may be in direct contact with the first light source and the second light source. It is also possible that the lens is spaced from the first light source and the second light source. In the latter case, the lens may be configured to shape the light from the first and second light sources both when entering the lens and when exiting the lens. The lens may be a refractive lens. It may also have reflective portions. The lens may be from a highly resistant and durable material, such as silicone. However, the lens may be made from any transparent or translucent material that has suitable refractive and, potentially, reflective properties.

According to a further embodiment, the lens comprises a total internal reflection portion, with a portion of the light emitted by either one of the first light source and the second light source being reflected by the total internal reflection portion, before leaving the multi-mode aircraft navigation light. Providing a total internal reflection portion is an effective way of concentrating light output in or around a particular light emission direction. In this way, a strong light output in a particular direction, such as a flight direction of the aircraft, can be achieved in the general framework of a lens. The lens may provide for the strong light output in the particular direction, while shaping the light output in other directions in a suitable manner.

According to a further embodiment, the common optical system comprises a common shutter element, arranged for blocking a portion of the light emitted by either one of the first light source and the second light source. The common shutter element may in particular block light in such a way that no light of a particular color overlaps into an unintended region. For example, for the case of a right/left forward navigation light, the common shutter element may be arranged to block light that would otherwise be emitted towards the wrong side. In particular, the common shutter element may be arranged to block green light from being emitted towards a left side of the aircraft and to block red light from being emitted towards a right side of the aircraft. With the red and green light outputs towards the right and towards the left being generally symmetrical, the common shutter element works generally well for both the functionality as a right navigation light and as a left navigation light.

According to a further embodiment, the multi-mode aircraft navigation light is of a substantially mirror-symmetric design. In this way, the multi-mode aircraft navigation light is well-adapted to the use of an aircraft navigation light, because the requirements for aircraft navigation lights are generally symmetric with respect to a horizontal plane. The term substantially symmetric means that the multi-mode aircraft navigation light is symmetric in design with respect to its optical set-up. It is apparent that the non-optical parts of the multi-mode aircraft navigation light, such as the circuitry thereof, may be arranged in a non-symmetric manner, without affecting the generally symmetric design of the multi-mode aircraft navigation light. The plane of symmetry may be a horizontal plane, when the multi-mode aircraft navigation light is mounted to the aircraft. The first light source and the second light source may be equally offset from the plane of symmetry. The first light source and the second light source may be offset by less than 10 mm from the plane of symmetry. It is also possible that both the first light source and the second are arranged side by side within the plane of symmetry, i.e. that both the first light source and the second light source have their centers generally within the plane of symmetry.

According to a further embodiment, the multi-mode aircraft navigation light comprises a plurality of first light sources of the first color and a plurality of second light sources of the second color, wherein the switching circuit is configured to effect power supply to a selected one or more of the plurality of first light sources, depending on a wear state of the plurality of first light sources and depending on the color selection signal, and wherein the switching circuit is configured to effect power supply to a selected one or more of the plurality of second light sources, depending on a wear state of the plurality of second light sources and depending on the color selection signal. In other words, the multi-mode aircraft navigation light may have redundancy in light sources for both the first color and the second color. For each of the first and second color, the multi-mode aircraft navigation light may adapt its operation to the wear state of the light source(s) of the color in question. For example, an exemplary multi-mode aircraft navigation light is positioned in the right wing tip of an airplane and is operated by emitting green light from one of its first light sources. Upon detecting a decay in light output or upon reaching a certain operating duration, the multi-mode aircraft navigation light may switch off the first light source, operated thus far, and may switch on another first light source, also emitting green light. In this way, required/desired light output levels may be maintained over a longer period of time than would be possible with a single light source of a particular color.

It is possible that the common optical system is arranged over the plurality of first light sources and the plurality of second light sources. In other words, there may be one common optical system for all of the plurality of first light sources and the plurality of second light sources. It is also possible that multiple units, each having a first light source of the first color, a second light source of the second color, a common optical system, and, possibly, a dedicated switching circuit, are provided in the multi-mode aircraft navigation light. The multi-mode aircraft navigation light may switch between the units for extending the useful life of the multi-mode aircraft navigation light. Also, such a set-up may provide for comprehensive redundancy, should one of the units get damaged for whatever reason.

It is further pointed out that the multi-mode aircraft navigation light according to exemplary embodiments of the invention may provide for an additional degree of redundancy when used in various locations in the aircraft. For example, if both the left side of an aircraft and the right side of the aircraft are provided with a multi-mode aircraft navigation light and the light output of one of the multi-mode aircraft navigation lights decays or one of the operated light sources has a malfunction, the two multi-mode aircraft navigation lights can be swapped. In this case, the thus far unused light sources would come into operation. Such a swap would probably result in the return to an operation according to specification.

According to a further embodiment, the multi-mode aircraft navigation light further comprises a wear detector, configured to detect a wear state of the first and second light sources. The detected wear state may be communicated to an outside of the multi-mode aircraft navigation light, e.g. to the cockpit or to ground personnel inspecting the aircraft between flights. The communication may be achieved via a wear state signal or via some form of alarm signal, such as a flashing LED somewhere on the multi-mode aircraft navigation light. It is also possible that the wear state is provided to the switching circuit, and the switching circuit may use available light source redundancy for maintaining safe operation. The wear detector may be a light detector configured for detecting a light output level. In particular, the light detector may be arranged to detect light emitted by either one of the first light source and the second light source. The light detector may be arranged in the light output path or may be provided with light emitted by the first or second light source and re-directed towards the light detector via suitable optical element(s). The wear detector may also be an operating time counter of the multi-mode aircraft navigation light or any other kind of detector that allows for a meaningful deduction/estimation of the wear state of the first and second light sources.

Exemplary embodiments of the invention further include an aircraft, comprising at least one multi-mode aircraft navigation light according to any of the embodiments above. The additional features, modifications, and beneficial effects, described above with respect to the exemplary embodiments of the multi-mode aircraft navigation light, apply to the aircraft in an analogous manner.

The aircraft may be an airplane or a helicopter or an unmanned aerial vehicle.

The aircraft may comprise a left multi-mode aircraft navigation light and a right multi-mode aircraft navigation light according to any of the embodiments above. In particular, the left multi-mode aircraft navigation light may be mounted to a left wing tip, in particular the left wing tip of an airplane, and the right multi-mode aircraft navigation light may be mounted to a right wing tip, in particular the right wing tip of an airplane.

BRIEF DESCRIPTION OF THE DRAWINGS

Exemplary embodiments of the invention are described in detail below with reference to the figures, wherein.

DETAILED DESCRIPTION

Figure 1:
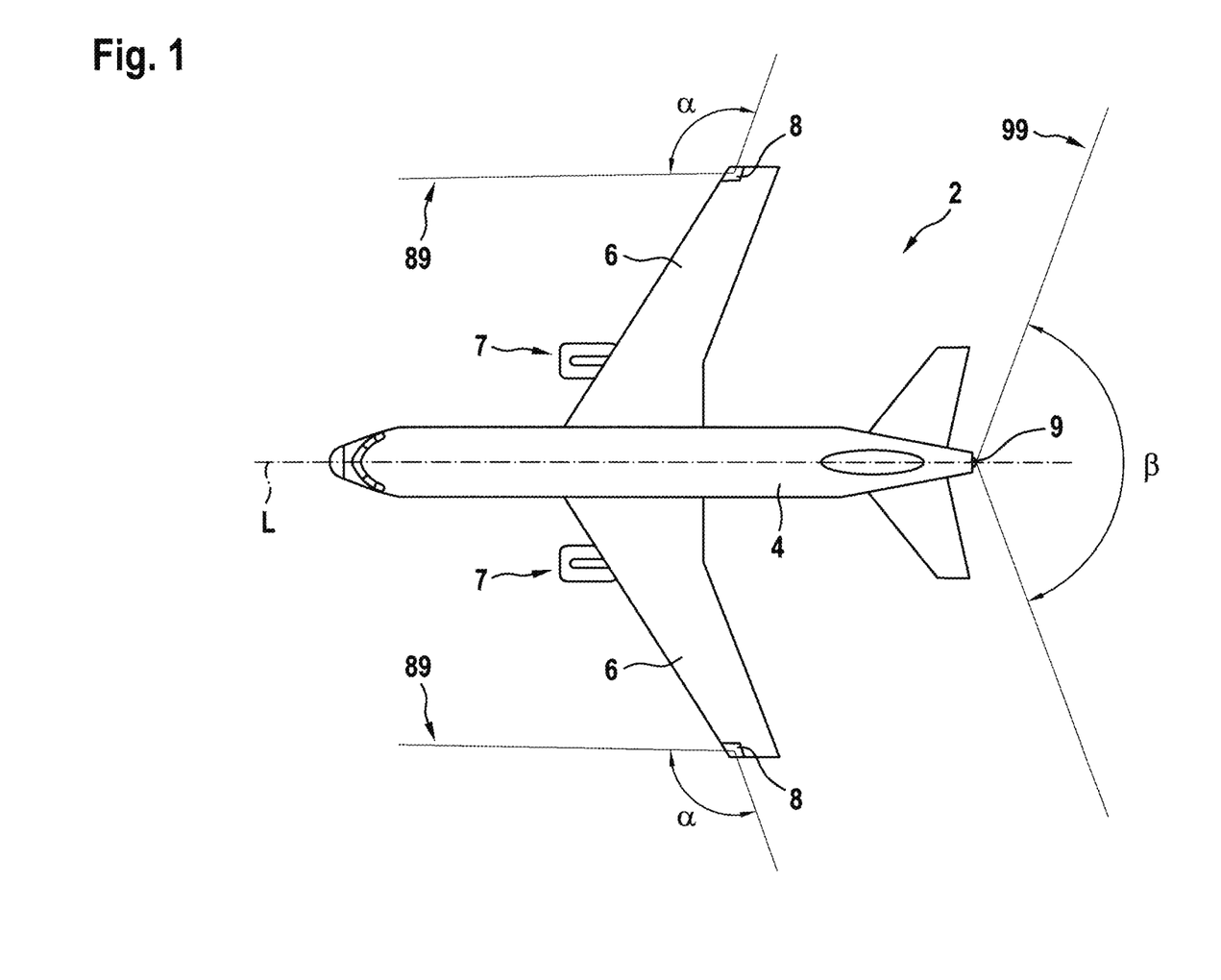
FIG. 1 depicts a schematic top view of an aircraft in accordance with an exemplary embodiment of the invention, the aircraft being equipped with three aircraft navigation lights.

FIG. 1 depicts a schematic top view of an aircraft 2, in particular an airplane 2, comprising a fuselage 4 and two wings 6 extending laterally from the fuselage 4. An engine 7 is mounted to each of the wings 6, respectively.

The aircraft 2 is provided with three aircraft navigation lights 8, 9, which may also be referred to as aircraft position lights 8, 9. The aircraft navigation lights 8, 9 include a tail navigation light 9, mounted to a tail end of the fuselage 4, and two forward navigation lights 8, respectively mounted to the outer wing tips of the wings 6. As will be explained below, the forward navigation lights 8 are multi-mode aircraft navigation lights in accordance with an exemplary embodiment of the invention.

When projected onto a virtual horizontal plane, the light output 89 emitted by the multi-mode aircraft navigation lights 8 covers an area extending from the direction of flight, i.e. 0°, which is parallel to a longitudinal axis L of the aircraft 2, outwardly over an angle α of 110°, i.e. 20° in the rearward direction. The multi-mode aircraft navigation light 8 mounted to the starboard side, i.e. to the right side when viewed in the direction of flight, emits green light, and the multi-mode aircraft navigation light 8 mounted to the port side, i.e. to the left side when viewed in the direction of flight, emits red light. As will be explained below, both multi-mode aircraft navigation lights 8 have at least one red light source and at least one green light source. Due to their position in the aircraft frame of reference, they emit either red light only or green light only.

The tail navigation light 9 emits a white light output 99. The light output 99 of the tail navigation light 9 extends over an angle β of 140° (+/−70°) in the virtual horizontal plane. The light output 99 of the tail navigation light 9 is centered around the longitudinal axis L of the aircraft 2. While the tail navigation light 9 could be a multi-mode aircraft navigation light in accordance with an exemplary embodiment of the invention, it is a single-mode aircraft navigation light, capable of emitting white light only, in the present exemplary embodiment.

The light outputs 89, 99 of the three aircraft navigation lights 8, 9, in combination, cover a full circle of 360° so that one of the three aircraft navigation lights 8, 9 is visible from any position around the aircraft 2.

Figure 2:
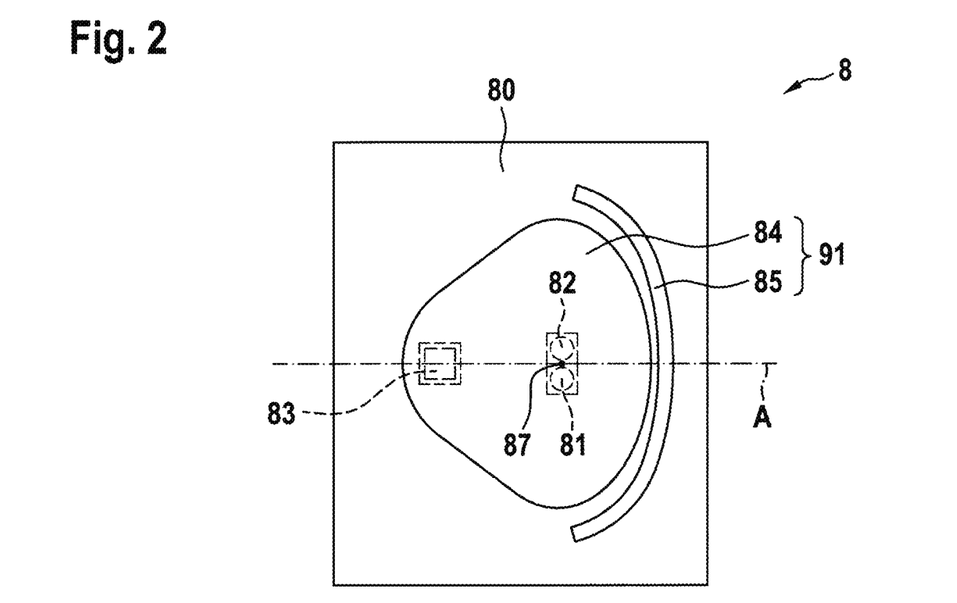
FIG. 2 shows a schematic top view of a multi-mode aircraft navigation light according to an exemplary embodiment of the invention.
Figure 3:
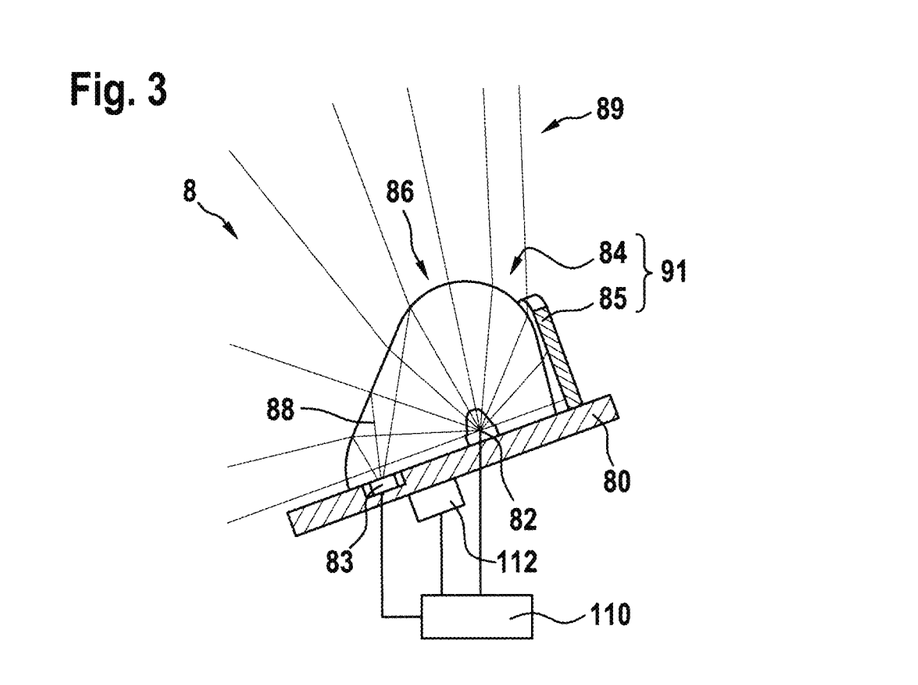
FIG. 3 shows a schematic cross-sectional view of the multi-mode aircraft navigation light shown in FIG. 2.
Figure 4:
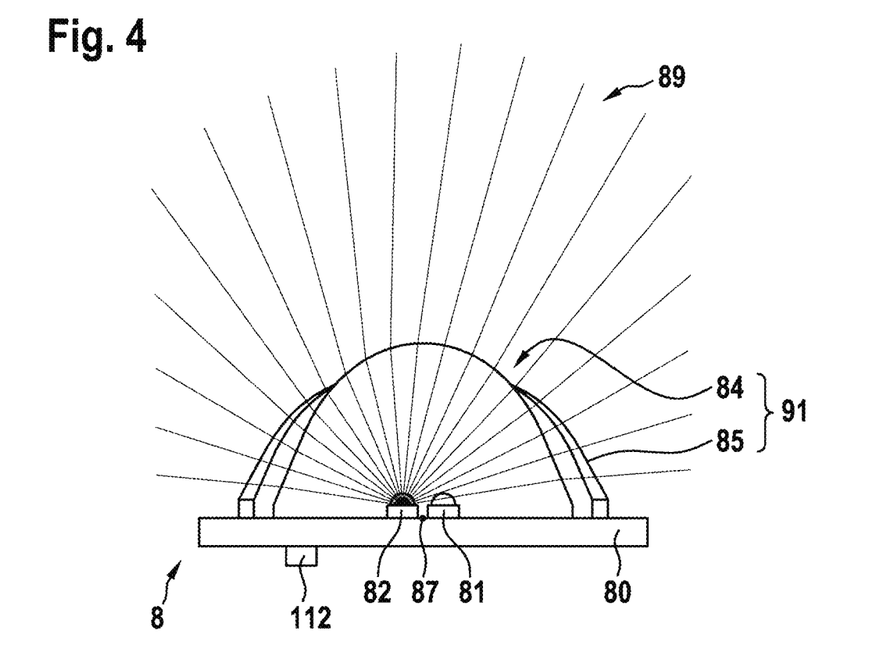
FIG. 4 shows a schematic front view of the multi-mode aircraft navigation light shown in FIGS. 2 and 3.

FIG. 2 shows a schematic top view of the multi-mode aircraft navigation light 8, FIG. 3 shows a schematic cross-sectional view thereof, and FIG. 4 shows a schematic front view thereof. The top view of FIG. 2 and the front view of FIG. 4 are denoted top and front views in the aircraft light frame of reference. As is apparent from basic geometric considerations, the views of FIGS. 2 and 4 are different side views in the aircraft frame of reference, i.e. when the multi-mode aircraft navigation light 8 is assembled to an aircraft.

The multi-mode aircraft navigation light 8 comprises two light sources 81, 82, namely a first light source 81 and a second light source 82, mounted to a common support plate 80. In the depicted exemplary embodiment, each of the first and second light sources 81, 82 is an LED. The first light source 81 is a green LED, and the second light source 82 is a red LED.

The common support plate 80 may be a printed circuit board (PCB), provided with electrical connections, which are configured for supplying electrical power to the first and second light sources 81, 82.

The first and second light sources 81, 82 are covered by a common, at least partially transparent or translucent lens 84. The lens 84 may be overmolded over the first and second light sources 81, 82. It may thus be in direct contact with the first and second light sources 81, 82. The lens 84 provides a transparent cover, covering and tightly encasing the first and second light sources 81, 82 with respect to the support plate 80, thus protecting the first and second light sources 81, 82. The lens 84 may be made of silicone, in particular of silicone having a refractive index of about 1.4.

The lens 84 not only covers the first and second light sources 81, 82, but further forms part of a common optical system 91 for the first and second light sources 81, 82, which is configured for shaping the light output 89 emitted by the first and second light sources 81, 82. It can also be said that the common optical system 91, in particular the lens 84 thereof, conditions the light emitted by the first and second light sources 81, 82. In the exemplary embodiment of FIGS. 2-4, the lens 84 mainly conditions the light of the first and second light sources 81, 82 via its refractive light exit surface 86.

The common optical system 91 comprising the lens 84 may be configured to generate the desired light output 89 extending over an angle α of 110°, as it is shown in FIG. 1. The multi-mode aircraft navigation light 8 additionally may be provided with a common shutter element 85, which is also part of the common optical system 91, and which is configured to block any light emitted beyond the direction of flight, i.e. configured to block any light towards the sector of the respectively other one of the two multi-mode aircraft navigation lights 8.

The shutter element 85 and the lens 84 are formed symmetrically with respect to a plane of symmetry A, shown in FIG. 2 and extending through the multi-mode aircraft navigation light 8. The plane of symmetry A is oriented horizontally, when the multi-mode aircraft navigation light 8 is mounted to the aircraft 2. The common optical system 91, including the lens 84 and the shutter element 85, is designed for shaping the light emitted by a light source which is arranged at a nominal light source location 87, also referred to as reference point 87, as shown in FIGS. 2 and 4 and located on said plane of symmetry A.

In the embodiment shown in FIGS. 2 to 4, none of the first and second light sources 81, 82 is arranged exactly at said reference point 87. Instead, both light sources 81, 82 are arranged symmetrically with respect to the plane of symmetry A at the same distance from the reference point 87. It is also possible that both the first light source 81 and the second light source 82 are arranged along the plane of symmetry A, i.e. along the line indicated with A in FIG. 2.

The common optical system 91 is designed so that small deviations of the positions of the light sources from the optimal reference point 87 do not considerably deteriorate the quality of the light output 89 of the multi-mode aircraft navigation light 8. I.e., the optical system 91 and the first and second light sources 81, 82 are designed so that a desired light output 89 having a desired light intensity distribution is generated and emitted by the multi-mode aircraft navigation light 8 despite the fact that none of the first and second light sources 81, 82 is arranged exactly at the reference point 87. Rather, the common optical system 91 and the first and second light sources 81, 82 are designed so that a desired light intensity distribution is achieved regardless of which one of the two light sources is switched on. In order to achieve this feature, the extension of the common optical system may be at least an order of magnitude greater than the distance between the centers of the first and second light sources 81, 82. In other words, the first and second light sources 81, 82 may be arranged very close to each other, as compared to the extension of the common optical system 91. For example, the common optical system 91 may have an extension of between 20 mm and 50 mm, while the distance between the centers of the first and second light sources may be in the range of between 1 mm and 5 mm.

Depending on which light source is switched on, the multi-mode aircraft navigation light 8 may emit red light or green light. Due to above described design of the first and second light sources 81, 82 being positioned closely to the reference point 87 and the common optical system 91 having a large extension as compared to the offset from the reference point 87, the output light intensity distribution is similar for red light and green light. The same multi-mode aircraft navigation light 8 may be used both on the left side of the aircraft 2 and on the right side of the aircraft 2. With a suitable selection of the light source to be operated, the multi-mode aircraft navigation light 8 may assume the functionality of either one of a right forward navigation light and a left forward navigation light.

In addition to the first and second light sources 81, 82, a wear detector 83, which is a photo detector, is mounted to the support plate 80. The wear detector 83 is also covered and tightly encased with respect to the support plate 80 by the lens 84. In the depicted exemplary embodiment, the wear detector 83 is arranged around the plane of symmetry A, extending through the multi-mode aircraft navigation light 8. As a result, the first and second light sources 81, 82 are arranged symmetrically with respect to the wear detector 83. It is pointed out that the wear detector is an entirely optional element and may also be dispensed with.

In a region close to the shutter element 85, which is depicted on the right side in FIGS. 2 and 3, the lens 84 has a curved portion with a curved cross-section, which is shaped for providing the desired light output 89. In a region more distant from the shutter element 85, i.e. in a region more to the left in FIGS. 2 and 3, the lens 84 has a linear portion with a linear cross-section, which also contributes to generating the desired light output 89. A portion 88 of the light emitted by the first and second light sources 81, 82 is reflected by this linear portion of the lens 84 towards the wear detector 83. Based on the amount of reflected light, which is detected by the wear detector 83, the wear state of each of first and second light sources 81, 82 may be determined. The linear portion of the lens 84 may be partially refractive and partially reflective for the given incident angles of the light from the first and second light sources 81, 82. It is pointed out that the given shape/design of the lens 84 is exemplary only and that various other shapes/designs may be provided.

As depicted as schematic function blocks in FIG. 3, the multi-mode aircraft navigation light 8 has a switching circuit 110 and an orientation sensor 112. The switching circuit 110 is coupled to the first and second light sources 81, 82 and may effect power to be supplied to either one of the first and second light sources 81, 82. In particular, the switching circuit 110 may effect power supply to a selected one of the first and second light sources 81, 82. In this way, the switching circuit 110 may determine the color of the light output to be red or green.

The orientation sensor 112 is an inertial sensor in the depicted exemplary embodiment. It is configured to determine, due to its orientation with respect to ground, whether the multi-mode aircraft navigation light is positioned on the right side of the aircraft 2 or on the left side of the aircraft 2. The orientation sensor 112 is coupled to the switching circuit 110 and communicates an orientation indication to the switching circuit 110. The switching circuit 110 interprets said orientation indication as a color selection signal and selectively switches on the green LED 81 or the red LED 82.

The wear detector 83 is also coupled to the switching circuit 110 in the depicted exemplary embodiment. In the depicted exemplary embodiment, the switching circuit 110 only passes on the information from the wear detector 83 to an outside entity, such as to the board computer. It is also possible that the switching circuit takes action in response to the information from the wear detector 83, as will be explained below.

FIG. 3 shows the multi-mode aircraft navigation light 8 in a cross-sectional view, taken along the plane of symmetry A, indicated in FIG. 2. It is assumed that the viewing direction towards the multi-mode aircraft navigation light 8 is from the top in the aircraft frame of reference in FIG. 3 and that the direction of flight, i.e. the forward direction in the aircraft frame of reference, is upwards in the viewing plane of FIG. 3. Hence, the multi-mode aircraft navigation light 8 of FIG. 3 is mounted to the aircraft 2 as a left forward navigation light. This can be seen from the light output 89, which ranges from forward in the aircraft frame of reference to the left, slightly rearward side.

In operation, the orientation sensor 112 detects the orientation of the multi-mode aircraft navigation light 8 with respect to the ground. In this way, the orientation sensor 112 deduces in operation that the multi-mode aircraft navigation light 8 is mounted to the left side of the aircraft 2. On the basis of this information, the switching circuit 110 effects power supply to the red LED 82 and does not affect power supply to the green LED 81. Accordingly, the multi-mode aircraft navigation light 8 emits the desired red light output, commensurate with its position on the left side of the aircraft 2.

FIG. 4 illustrates, for the operating condition of FIG. 3, that the red LED 82 emits light, while the green LED 81 is inactive. The resulting light output 89 is red. While the first and second light sources 81, 82 are shown as dome-shaped for better illustration, it is apparent that the first and second light sources 81, 82 may be substantially flat structures, keeping the mutual shadowing effects low.

Figure 5:
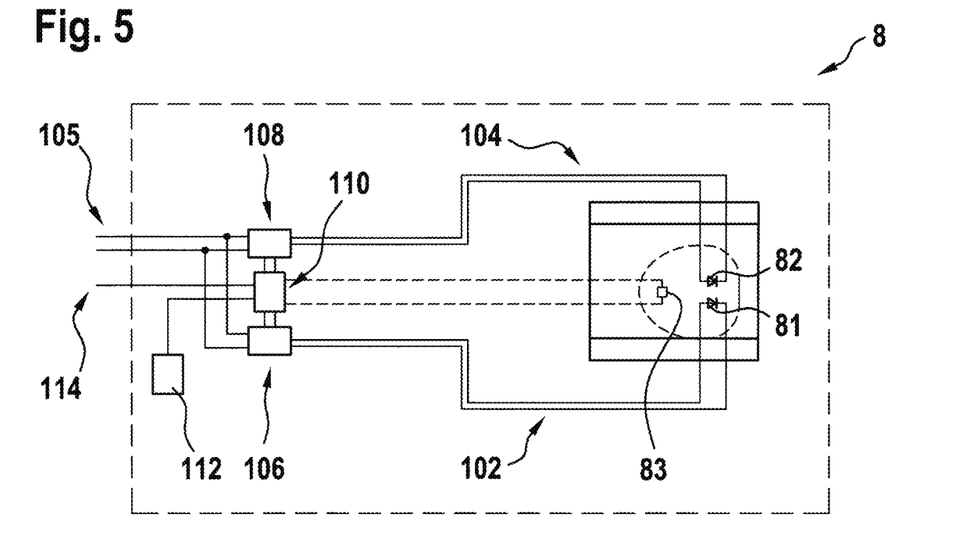
FIG. 5 shows a schematic circuit diagram of the multi-mode aircraft navigation light shown in FIGS. 2 to 4.

FIG. 5 shows a schematic circuit diagram of the multi-mode aircraft navigation light 8 of FIGS. 2 to 4. The multi-mode aircraft navigation light has a power input 105, and a control input/output 114. Via the power input 105, the multi-mode aircraft navigation light 8 receives power from an external power supply, such as from an on-board power distribution network. Via the control input/output 114, the multi-mode aircraft navigation light 8 receives on/off commands, e.g. issued by the pilot in the cockpit, and outputs information about the wear state of the light sources, as detected by the wear detector 83, as described above. The control input/output 114 is coupled to the switching circuit 110, which receives the on/off commands and which passes on the information about the wear state from the wear detector 83.

The power input 105 is coupled to a first driving circuit 106 and to a second driving circuit 108. The first driving circuit 106 is coupled to the first light source 81 via a first power line 102. The second driving circuit 108 is coupled to the second light source 82 via a second power line 104.

As laid out above, the switching circuit 110 receives an orientation indication from the orientation sensor 112 and interprets said orientation indication as a color selection signal. On the basis of this color selection signal, the switching circuit 110 either causes the first driving circuit 106 to supply power to and thus illuminate the first light source 81 or causes the second driving circuit 108 to supply power to and thus illuminate the second light source 82.

The first and second driving circuits 106, 108 are configured to supply power of a suitable voltage and/or a suitable current to the first light source 81 and the second light source 82, respectively. For example, the red LED may have a different forward voltage drop than the green LED, and the first and second driving circuits 106, 108 may have different configurations for accommodating for this difference in operation. It is also possible that the first and second driving circuits 106, 108 provide different operating currents to the first and second light sources 81, 82, in order to account for different electric behaviors thereof.

Figure 6:
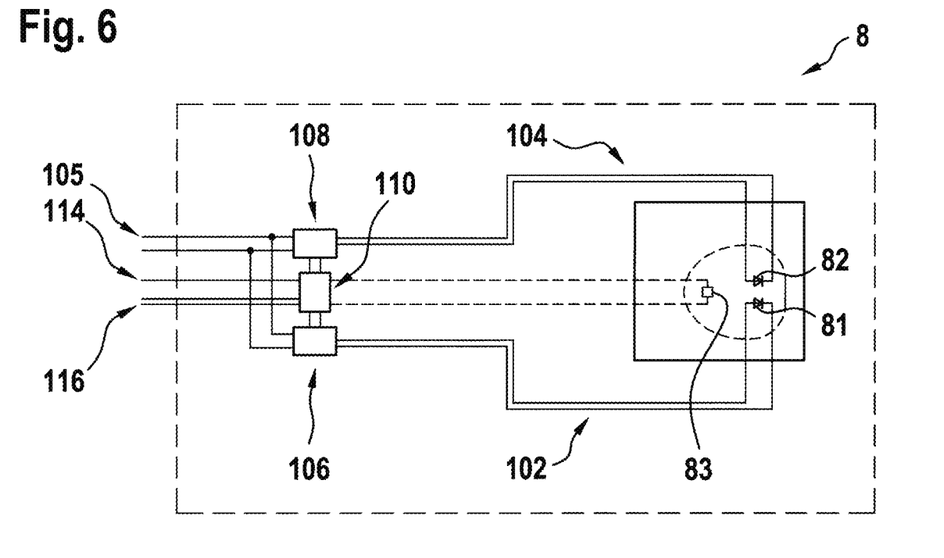
FIG. 6 shows a schematic circuit diagram of a multi-mode aircraft navigation light according to an adapted exemplary embodiment of the invention.

FIG. 6 shows a schematic circuit diagram of a multi-mode aircraft navigation light 8 according to an adapted exemplary embodiment of the invention. The exemplary embodiment of FIG. 6 is similar to the embodiment of FIGS. 2-5, and reference is made to above description of FIGS. 2-5 for the discussion of alike components. The multi-mode aircraft navigation light 8 of FIG. 6 does not have an orientation sensor. Rather, the multi-mode aircraft navigation light 8 of FIG. 6 has a color selection input 116. The color selection input 116 has two connectors, each of which is associated with one of the two colors of the multi-mode aircraft navigation light 8. A particular signal on the upper one of the two connectors indicates to the switching circuit 110 that the first light source 81 is to be operated, i.e. that the multi-mode aircraft navigation light is supposed to emit green light. A particular signal on the lower one of the two connectors indicates to the switching circuit 110 that the second light source 82 is to be operated, i.e. that the multi-mode aircraft navigation light is supposed to emit red light. It is also possible that the color selection input is a single signal line and that the switching circuit 110 is configured to interpret the signal received via the color selection input and to selectively operate the desired light source.

Figure 7:
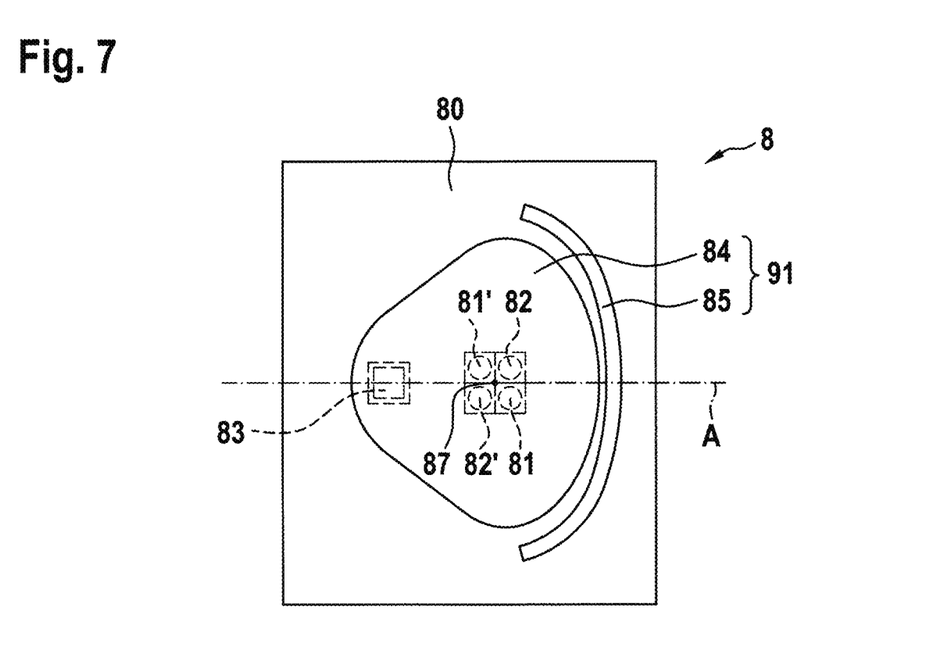
FIG. 7 shows a schematic top view of a multi-mode aircraft navigation light according to another exemplary embodiment of the invention.

FIG. 7 shows a schematic top view of a multi-mode aircraft navigation light 8 according to another exemplary embodiment of the invention. The exemplary embodiment of FIG. 7 is similar to the embodiment of FIGS. 2-5, and reference is made to above description of FIGS. 2-5 for the discussion of alike components. The multi-mode aircraft navigation light 8 of FIG. 7 has two first light sources 81, 81' and two second light sources 82, 82'. The additional first and second light sources 81' and 82' are provided for redundancy purposes. When a weak light emission or no light emission by the first light source 81 or the second light source 82 is detected, the multi-mode aircraft navigation light 82 switches over to the additional first light source 81' or the additional second light source 82'. The two first light sources 81, 81' and the two second light sources 82, 82' are arranged around the reference point 87.

Figure 8:
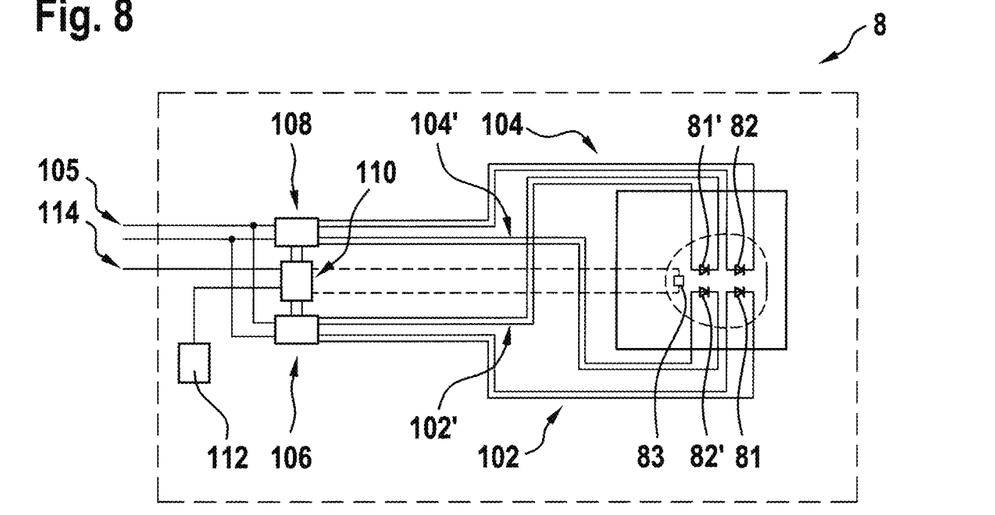
FIG. 8 shows a schematic circuit diagram of the multi-mode aircraft navigation light shown in FIG. 7.

FIG. 8 shows a schematic circuit diagram of the multi-mode aircraft navigation light 2 shown in FIG. 7. The first driving circuit 106 is additionally coupled to the additional first light source 81' via an additional first power line 102'. The second driving circuit 108 is coupled to the additional second light source 82' via an additional second power line 104'. In the exemplary embodiment of FIGS. 7 and 8, the switching circuit is configured to control the first and second driving circuits 106, 108 on the basis of both the orientation indication from the orientation sensor 112 and the information from the wear detector 83. In particular, the switching circuit 110 determines which of the first and second driving circuits 106, 108 provides power and determines which of the light sources coupled to the respective driving circuit is supplied with power.

For example, in a case where the orientation indication indicates the selection of the red color and the switching circuit 110 initially determines that the desired red light is provided by the second light source 82, the wear detector 83 may detect a weakness or malfunction of the second light source 82. In response thereto, the switching circuit may cause the second driving circuit 108 to stop providing power to the second light source 82 and, instead, cause the second driving circuit 108 to provide power to the additional second light source 82'. In case a problem, such as a reduced light emission, is detected for both second light sources 82, 82', the switching circuit 110 may be configured to cause the second driving circuit 108 to cause power to be supplied to both second light sources 82, 82' simultaneously for combining the light emissions of the two second light sources 82, 82', in order to maintain a sufficient level of light output.

Figure 9:
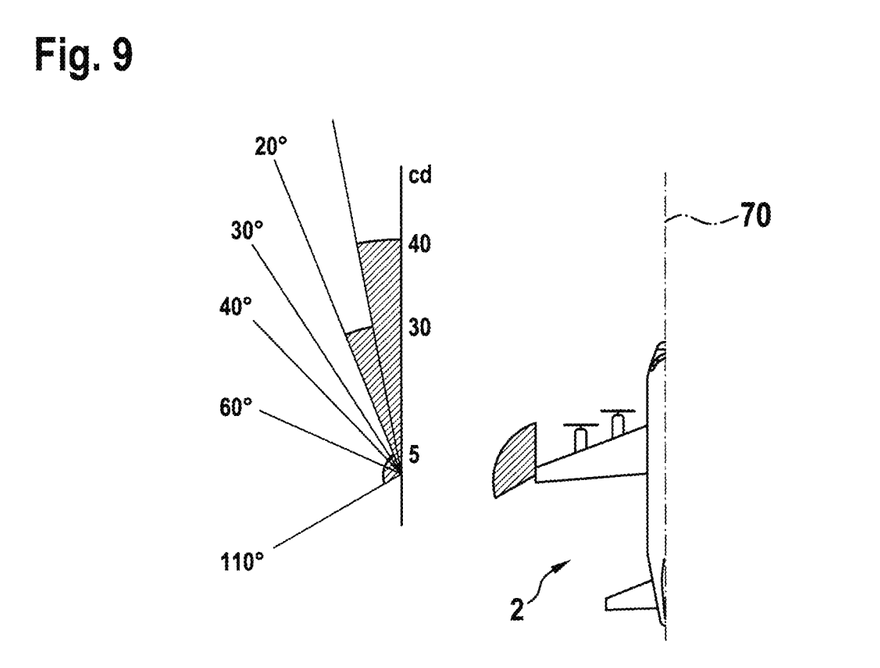
FIG. 9 illustrates the light intensity distribution of a left forward navigation light, as required by the Federal Aviation Regulations (FAR)

FIG. 9 illustrates the light intensity distribution of a left forward navigation light, as required by the Federal Aviation Regulations (FAR). In particular, FIG. 9 shows, on the right hand side, a schematic illustration of an airplane 2, having a longitudinal axis 70, coinciding with the nominal direction of flight. The light output of the left forward navigation light is indicated with a hatched sector around the left wing tip of the airplane 2. The required FAR light intensity values for forward navigation lights, as set out in FAR section 25.1391 for the horizontal plane, are depicted on the left side of FIG. 9. The FAR requirements cover an angular range between the longitudinal axis of the aircraft and an angle of 110° thereto. It is illustrated that the output light intensity distribution has three distinct output regions, namely a peak region of at least 40 cd between the longitudinal axis of the airplane and an angle of 10° thereto, a medium light intensity region of at least 30 cd between 10° and 20°, and a low light intensity region of at least 5 cd between 20° and 110°. The multi-mode aircraft navigation light, described herein in the context of forward navigation lights, fulfills these requirements.

Figure 10:
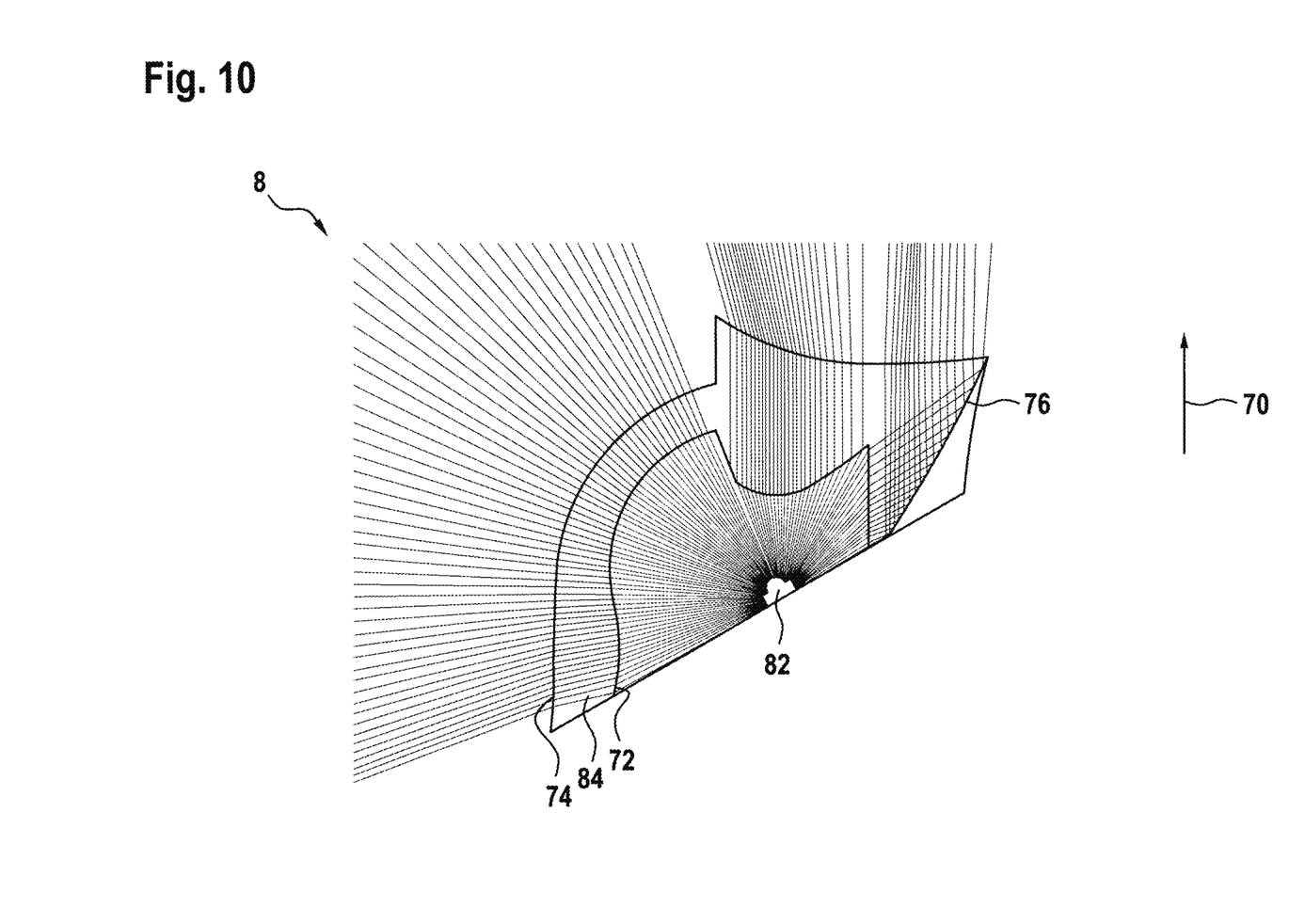
FIG. 10 shows a schematic cross-sectional view of selected components of a multi-mode aircraft navigation light according to yet another exemplary embodiment of the invention.

FIG. 10 shows a schematic cross-sectional view of selected components of a multi-mode aircraft navigation light 8 according to a further exemplary embodiment of the invention. In particular, FIG. 10 depicts the second light source 82 and a lens 84, which is different from the lens 84 discussed above. The cross-sectional view of FIG. 10 is analogous to the cross-sectional view of FIG. 3, both in terms of the orientation/position of the multi-mode aircraft navigation light 8 and the cross-sectional plane therethrough. Hence, the first light source 81 is also not shown in FIG. 10, because it is more towards the observer of FIG. 10 than the cross-sectional plane.

The lens 84 is an elaborate free form lens. In the exemplary embodiment of FIG. 10, the optical system consists of the lens 84. The lens 84 of the exemplary embodiment of FIG. 10 has an internal refractive surface 72 and an external refractive surface 74. The light from the second light source 82 is conditioned both at the internal refractive surface 72, also referred to as light entry surface, and at the external refractive surface, also referred to as light exit surface. In addition, the lens 84 has a total internal reflection portion 76. Some of the light from the second light source 82 is internally reflected at the total internal reflection portion 76, before leaving the lens 84 at the external refractive surface 74. In this way, a strong collimation of light in and close to the direction of flight 70 may be achieved. The FAR requirements for forward navigation lights, as illustrated in FIG. 9, may be achieved in a particularly efficient manner.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. A multi-mode aircraft navigation light, comprising:
    a first light source of a first color, wherein the first color is green;
    a second light source of a second color, wherein the second color is red; and
    a common optical system arranged over the first light source and the second light source for conditioning light emitted by either one of the first light source and the second light source; and
    a switching circuit configured to effect power supply to a selected one of the first light source and the second light source depending on a color selection signal; and
    an orientation sensor, configured to detect an orientation of the multi-mode aircraft navigation light and to provide an orientation indication to the switching circuit, wherein the color selection signal is based on the orientation indication;
    wherein the orientation sensor comprises at least one of: an inertial sensor and an optical sensor; and
    wherein the multi-mode aircraft navigation light is usable as a left forward navigation light in a left wing tip of an aircraft and as a right forward navigation light in a right wing tip of an aircraft.

2. The multi-mode aircraft navigation light according to claim 1, wherein the first light source is a green LED and wherein the second light source is a red LED.

3. The multi-mode aircraft navigation light according to claim 1, wherein the inertial sensor is an accelerometer.

4. The multi-mode aircraft navigation light according to claim 1, further comprising:
    a first driving circuit, configured to selectively supply power to the first light source; and
    a second driving circuit, configured to selectively supply power to the second light source;
    wherein the switching circuit is coupled to the first driving circuit and to the second driving circuit and wherein the switching circuit is configured to cause a selected one of the first driving circuit and the second driving circuit to supply power to the first light source or the second light source.

5. The multi-mode aircraft navigation light according to claim 1, wherein the common optical system comprises a lens jointly encasing the first light source and the second light source.

6. The multi-mode aircraft navigation light according to claim 5, wherein the lens is in direct contact with the first light source and the second light source.

7. The multi-mode aircraft navigation light according to claim 5, wherein the lens comprises a total internal reflection portion, with a portion of the light emitted by either one of the first light source and the second light source being reflected by the total internal reflection portion, before leaving the multi-mode aircraft navigation light.

8. The multi-mode aircraft navigation light according to claim 5, wherein the common optical system comprises a common shutter element, arranged for blocking a portion of the light emitted by either one of the first light source and the second light source.

9. The multi-mode aircraft navigation light according to claim 1, wherein the multi-mode aircraft navigation light is of a substantially mirror-symmetric design, with the first light source and the second light source in particular being equally offset from a plane of symmetry.

10. The multi-mode aircraft navigation light according to claim 1, comprising a plurality of first light sources of the first color and a plurality of second light sources of the second color, wherein the switching circuit is configured to effect power supply to a selected one or more of the plurality of first light sources, depending on a wear state of the plurality of first light sources and depending on the color selection signal, and wherein the switching circuit is configured to effect power supply to a selected one or more of the plurality of second light sources, depending on a wear state of the plurality of second light sources and depending on the color selection signal.

11. The multi-mode aircraft navigation light according to 1, comprising a wear detector, configured to detect a wear state of the first and second light sources, wherein the wear detector in particular is a light detector configured for detecting a light output level.

12. An aircraft comprising:
   at least one multi-mode aircraft navigation light according to claim 1.

13. The aircraft of claim 12, wherein the, at least one multi-mode aircraft navigation light includes a left multi-mode aircraft navigation light and a right multi-mode aircraft navigation light.

14. The multi-mode aircraft navigation light according to claim 1, wherein the optical sensor is a camera.

15. A multi-mode aircraft navigation light, comprising:
   a first light source of a first color, wherein the first color is green;
   a second light source of a second color, wherein the second color is red; and
   a common optical system arranged over the first light source and the second light source for conditioning light emitted by either one of the first light source and the second light source; and
   a switching circuit configured to effect power supply to a selected one of the first light source and the second light source depending on a color selection signal; and
   a color selection input, configured to receive the color selection signal from outside of the multi-mode aircraft navigation light;
   wherein the color selection input comprises a plurality of connectors, with each of the plurality of connectors corresponding to a particular color selection; and
   wherein the multi-mode aircraft navigation light is usable as a left forward navigation light in a left wing tip of an aircraft and as a right forward navigation light in a right wing tip of an aircraft.

16. The multi-mode aircraft navigation light according to claim 15, wherein the first light source is a green LED and wherein the second light source is a red LED.

17. The multi-mode aircraft navigation light according to claim 15, further comprising:
   a first driving circuit, configured to selectively supply power to the first light source; and
   a second driving circuit, configured to selectively supply power to the second light source;
   wherein the switching circuit is coupled to the first driving circuit and to the second driving circuit and wherein the switching circuit is configured to cause a selected one of the first driving circuit and the second driving circuit to supply power to the first light source or the second light source.

18. The multi-mode aircraft navigation light according to claim 15, wherein the common optical system comprises a lens jointly encasing the first light source and the second light source.

19. The multi-mode aircraft navigation light according to claim 15, wherein the multi-mode aircraft navigation light is of a substantially mirror-symmetric design, with the first light source and the second light source in particular being equally offset from a plane of symmetry.

20. An aircraft comprising:
   at least one multi-mode aircraft navigation light according to claim 15.

* * * * *